(12) United States Patent
Rosado Rios

(10) Patent No.: US 10,132,455 B2
(45) Date of Patent: Nov. 20, 2018

(54) SUBMERSIBLE SOLAR LIGHTING SYSTEM

(71) Applicant: Juan Rosado Rios, Benalmadena (ES)

(72) Inventor: Juan Rosado Rios, Benalmadena (ES)

( * ) Notice: Subject to any disclaimer, the term of this patent is extended or adjusted under 35 U.S.C. 154(b) by 0 days.

(21) Appl. No.: 15/125,189

(22) PCT Filed: Mar. 11, 2015

(86) PCT No.: PCT/ES2015/000033
§ 371 (c)(1),
(2) Date: Sep. 12, 2016

(87) PCT Pub. No.: WO2015/136129
PCT Pub. Date: Sep. 17, 2015

(65) Prior Publication Data
US 2017/0074475 A1 Mar. 16, 2017

(30) Foreign Application Priority Data
Mar. 12, 2014 (ES) ................ 201400214 U

(51) Int. Cl.
| | | |
|---|---|---|
| *F21S 9/03* | (2006.01) | |
| *E04H 4/14* | (2006.01) | |
| *H02S 40/38* | (2014.01) | |
| *F21V 21/08* | (2006.01) | |
| *F21V 23/04* | (2006.01) | |
| *F21V 31/00* | (2006.01) | |

(Continued)

(52) U.S. Cl.
CPC .............. *F21S 9/037* (2013.01); *E04H 4/148* (2013.01); *F21V 21/0808* (2013.01); *F21V 23/04* (2013.01); *F21V 31/005* (2013.01); *H02J 7/35* (2013.01); *H02S 40/38* (2014.12); *F21W 2131/401* (2013.01)

(58) Field of Classification Search
CPC ... F21S 9/03; F21S 9/035; F21S 9/037; E04H 4/148; F21W 2131/401
USPC .................................................. 362/158, 157
See application file for complete search history.

(56) References Cited

U.S. PATENT DOCUMENTS 4,809,458 A * 3/1989 Tanikuro ............... B63B 22/166
136/291
5,231,781 A * 8/1993 Dunbar .................. A01K 93/02
136/291

(Continued)

FOREIGN PATENT DOCUMENTS

| | | |
|---|---|---|
| DE | 202008010670 | 11/2008 |
| WO | WO 2013/080836 | 6/2013 |
| WO | WO 2015/136129 | 9/2015 |

OTHER PUBLICATIONS

Machine translation of DE 202008010670, Popescu R., "Solar-Leuchte", Nov. 20, 2008, pp. 1-3.*

(Continued)

*Primary Examiner* — Paultep Savusdiphol

(57) ABSTRACT

The invention comprises a submersible solar lighting source, which incorporates photovoltaic panels, batteries, a lighting system and control in one and the same sealed, thin planar unit that allows illumination of the swimming pool during the night, and which has a slim design such that it can be adhered or fastened to the wall, steps or bottom of the swimming pool, allowing convenient wiring-free installation that does not interfere with the use of the pool.

4 Claims, 2 Drawing Sheets

(51) Int. Cl.
*H02J 7/35* (2006.01)
*F21W 131/401* (2006.01)

(56) References Cited

U.S. PATENT DOCUMENTS

| | | | | |
|---|---|---|---|---|
| 5,782,552 | A * | 7/1998 | Green | F21S 9/037 |
| | | | | 362/183 |
| 6,459,218 | B2 * | 10/2002 | Boys | F21S 8/032 |
| | | | | 315/236 |
| 2003/0048632 | A1 | 3/2003 | Archer | |
| 2006/0152915 | A1 | 7/2006 | Currie et al. | |
| 2007/0034248 | A1 * | 2/2007 | Romano | F21S 8/00 |
| | | | | 136/244 |
| 2010/0109556 | A1 | 5/2010 | Mosholder, Jr. et al. | |
| 2014/0218900 | A1 * | 8/2014 | Adair | F21S 8/022 |
| | | | | 362/183 |
| 2014/0247584 | A1 * | 9/2014 | Kodama | H01L 27/3227 |
| | | | | 362/183 |

OTHER PUBLICATIONS

International Search Report and the Written Opinion Dated Jun. 2, 2015 From the Oficina Espanola de Patentes y Marcas Re. Application No. PCT/ES2015/000033 and Its Translation of Search Report Into English.

* cited by examiner

SUBMERSIBLE SOLAR LIGHTING SYSTEM

RELATED APPLICATIONS

This application is a National Phase of PCT Patent Application No. PCT/ES2015/000033 having International filing date of Mar. 11, 2015, which claims the benefit of priority of Spanish Patent Application No. U201400214 filed on Mar. 12, 2014. The contents of the above applications are all incorporated by reference as if fully set forth herein in their entirety.

OBJECT OF THE INVENTION

The invention, as stated in the title of the present specification, describes a submersible solar lighting system chiefly intended for swimming pools that lack lighting.

More specifically, the object of the invention of the patent consists of a submersible solar lighting system that incorporates a battery charging system via photovoltaic panels, batteries and a lighting system with automatic activation in one and the same sealed, thin planar unit that allows illumination of the swimming pool at night and which has a slim design such that it can be adhered or fastened to the wall, steps or bottom of the swimming pool, allowing wiring-free installation that does not interfere with the use of the pool.

BACKGROUND OF THE INVENTION

Currently there are a large number of solar lighting systems for swimming pools that are equipped with a photovoltaic panel that charges a battery or accumulator during the day and a lighting system that activates during the night. Said systems tend to be designed to float on the surface of the water, such that the area that remains afloat contains the solar panels and the submerged portion contains the lighting system to be able to light up the bottom of the swimming pool, and in order for the accumulators to recharge, they must be floating during the day in the swimming pool, thus limiting the use thereof since they are floating on the surface.

There are also systems that consist of placing the photovoltaic solar panel outside the swimming pool and provide the lighting devices inside the swimming pool with electric power via a wiring installation.

SUMMARY OF THE INVENTION

The device described herein comprises a solar gain system formed by photovoltaic cells that enable batteries to be charged during daylight hours, as well as a lighting system that automatically activates during the hours of darkness via an electronic circuit. The photovoltaic solar cell and lighting system assembly are mounted on the same front plane of the device, covered by a transparent material that enables both light input to the photovoltaic panels and light output through the lighting system. Below these are the batteries and the electronic control circuit in a unit injected with material adhered underneath the solar gain and lighting system, forming a single solid and sealed unit with a slim profile, thus enabling it to not interfere with the use of the swimming pool once adhered or fastened therein and not requiring wiring installation.

BRIEF DESCRIPTION OF THE SEVERAL VIEWS OF THE DRAWINGS

To complete the present description, and for the purpose of aiding in a better understanding of the characteristics of the invention, a set of drawings is attached to the present specification as an integral part thereof, wherein, by way of non-limiting examples, the following has been represented.

DESCRIPTION OF SPECIFIC EMBODIMENTS OF THE INVENTION

Figure 1:
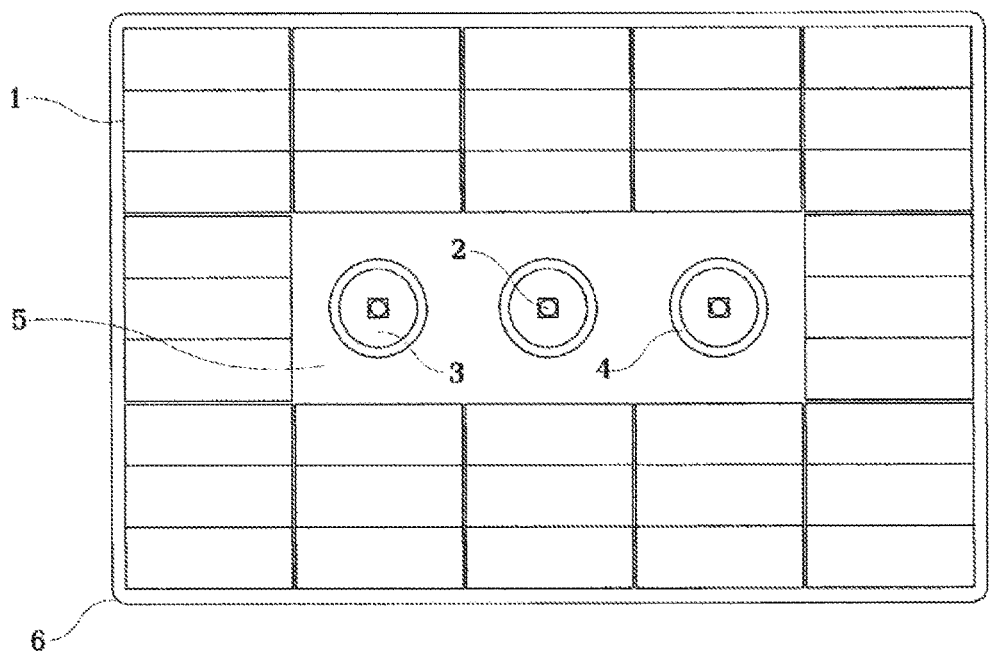
FIG. 1 shows a front view of the device wherein the solar gain system comprised by a series of photovoltaic panels and the lighting system may be seen.

FIG. 1 shows a front view of the device wherein the arrangement of the photovoltaic solar panels (1) used to capture light may be seen, and in turn the light emitters (2) may be seen mounted on a refracting surface (3) surrounded by an opaque barrier (4) that prevents the light generated by the light emitters (2) from propagating to the photovoltaic panels (1) through the transparent and solid protective material (5) that forms the front of the device, and in turn the design of the rounded corners (6) may be seen.

Figure 2:
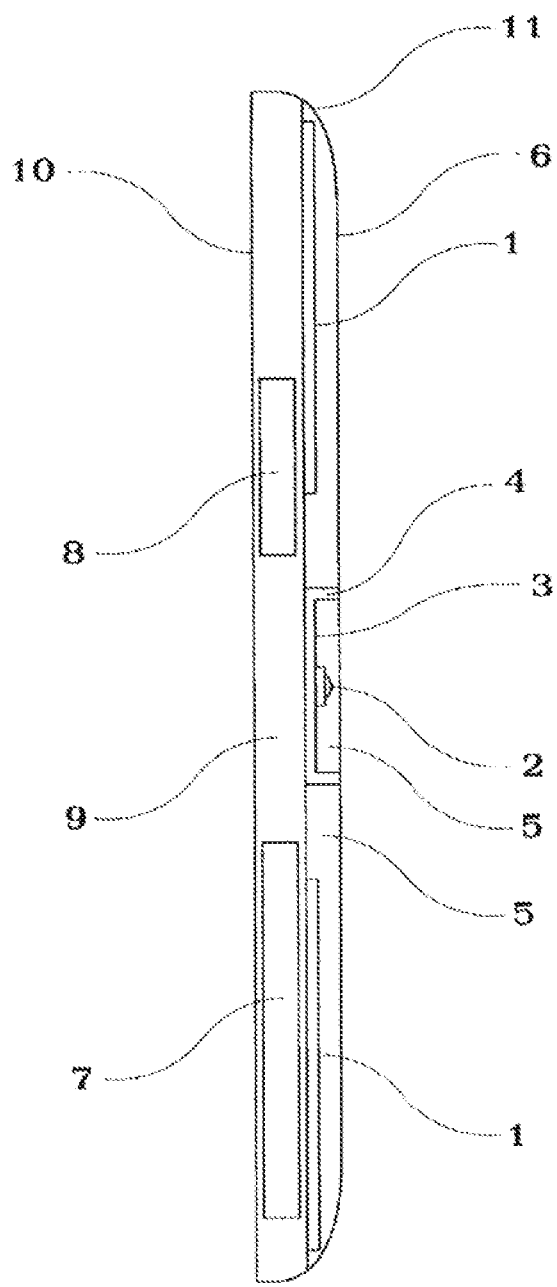
FIG. 2 shows a transverse cross section of the device wherein the placement of the photovoltaic panels and the lighting system, as well as the controller circuit and the battery may be seen, all of which are inside a protective material, forming a sealed, thin unit without edges on the front portion thereof.

FIG. 2 shows a transverse cross section of the device wherein the front face (6) of the photovoltaic panels (1) and the light emitters (2) that are arranged on a refracting surface (3) may be seen, the refracting surface being surrounded by an opaque barrier (4) that prevents the light generated by the light emitters (2) from propagating through the transparent and solid protective material (5) that forms the front of the device towards the photovoltaic panels (1), these being responsible for charging the batteries (7) during daylight hours, the control circuit (8) being responsible for turning the lighting system (2) on and off according to the light present, as well as controlling the charging and discharging of the batteries (7). The control circuit (8) and the batteries (7) are in turn found inside a solid and protective material (9) that may be similar to the material of the front portion (5), the connection of both making the assembly a single solid and sealed unit which may be adhered, fastened or placed inside the swimming pool on the rear face (10). One may also see the rounded shape (11) of the front vertices of the device to prevent the possibility of harming the swimming pool users.

What is claimed is:

1. A submersible solar lighting system for nighttime illumination, comprising wherein
   a plurality of photovoltaic solar panels,
   batteries charged by the plurality of photovoltaic solar panels, and
   a plurality of light emitters having an automatic activation control circuit;
   a solid sealed thin planar unit moulded to incorporate the plurality of photovoltaic solar panels, the batteries and the plurality of light emitters; and
   wherein the sealed thin planar unit having a rear face adapted to be adhered or fastened to a wall, steps or bottom, of a swimming pool for convenient wiring-free installation that does not interfere with the use of the swimming pool;
   wherein the plurality of the photovoltaic panels and the plurality of light emitters are found on a common plane;

wherein the sealed thin planar unit is moulded to incorporate all the components thereof such that it forms a solid and sealed unit.

2. The submersible solar lighting system according to claim 1, wherein the sealed thin planar unit has a thin design that is free of edges so as to not interfere with the use of the space it occupies.

3. The submersible solar lighting system according to claim 1, wherein the plurality of photovoltaic panels and the plurality of light emitters are covered by a transparent material.

4. The submersible solar lighting system according to claim 1, wherein the plurality of light emitters are mounted in a reflective area having a perimeter built with opaque material to prevent light emitted by the plurality of light emitters from propagating to the plurality of photovoltaic panels.

* * * * *